(12) United States Patent
Huseman

(10) Patent No.: US 8,116,955 B2
(45) Date of Patent: Feb. 14, 2012

(54) METHOD OF CONTROLLING BRAKE POWER FOR A VEHICLE WITH AN ELECTRICALLY VARIABLE TRANSMISSION

(75) Inventor: Steven C. Huseman, Noblesville, IN (US)

(73) Assignee: GM Global Technology Operations LLC, Detroit, MI (US)

( * ) Notice: Subject to any disclaimer, the term of this patent is extended or adjusted under 35 U.S.C. 154(b) by 445 days.

(21) Appl. No.: 12/474,673

(22) Filed: May 29, 2009

(65) Prior Publication Data

US 2010/0305821 A1   Dec. 2, 2010

(51) Int. Cl.
*H02P 3/04* (2006.01)
*B60K 6/00* (2007.10)
*G06F 19/00* (2006.01)

(52) U.S. Cl. .................... 701/54; 701/22; 180/65.3

(58) Field of Classification Search .............. 701/54, 701/22, 101, 108; 477/27, 5, 37; 303/152; 180/65.3, 165; 123/543, 41.12

See application file for complete search history.

(56) References Cited

U.S. PATENT DOCUMENTS

| 6,450,275 | B1* | 9/2002 | Gabriel et al. ............. 180/65.23 |
| 7,131,708 | B2 | 11/2006 | Tao et al. |
| 2003/0120996 | A1* | 6/2003 | D'Arcy et al. ................ 714/795 |
| 2005/0151420 | A1* | 7/2005 | Crombez et al. ............. 303/152 |
| 2005/0255966 | A1 | 11/2005 | Tao et al. |
| 2008/0276913 | A1* | 11/2008 | Zubeck ........................ 123/543 |
| 2009/0314563 | A1* | 12/2009 | Burkholder .............. 180/65.265 |

FOREIGN PATENT DOCUMENTS

DE   10226308 A1   12/2003

* cited by examiner

*Primary Examiner* — Tan Q Nguyen
(74) *Attorney, Agent, or Firm* — Quinn Law Group, PLLC

(57) ABSTRACT

A method of controlling brake power flow for a vehicle with an electrically variable transmission is provided. When the brake power exceeds a power absorption capability of the energy storage system, then vehicle conditions are evaluated to determine if control of an engine fan is allowable. When conditions allow for fan control then the remaining brake power is provided for operation of the engine fan. Any excess brake power is dissipated through the exhaust brake or used by other vehicle accessories.

13 Claims, 2 Drawing Sheets

METHOD OF CONTROLLING BRAKE POWER FOR A VEHICLE WITH AN ELECTRICALLY VARIABLE TRANSMISSION

TECHNICAL FIELD

The present invention relates, generally, to a vehicle having an electrically variable transmission, and more specifically, to a system for managing regenerative braking power for the electrically variable transmission.

BACKGROUND OF THE INVENTION

Vehicles with electrically variable transmissions are commonly driven in part by the transmission including the associated battery and motor/generators. Excess energy from vehicle operation is stored in the battery. The large amounts of kinetic energy from braking are converted to electrical energy and may be used to regenerate the battery charge. However, if the battery has a sufficient state of charge then the excess energy from vehicle braking must be dissipated. Typically, for large vehicles this energy is dissipated through engine/driveline retarder braking and the vehicle service brakes, also known as exhaust braking. The engine retard braking may be coordinated by the vehicle and is not necessarily operator dependent.

In addition to providing power to propel the vehicle, the engine and battery system provide an auxiliary power for various vehicle functions. One of these functions is powering the engine fan. For heavy duty vehicles in particular the engine fan represents a significant parasitic load on the power train which is most cases is provided directly from fuel supplied to the engine. For example, the engine cooling fan may draw from twenty to fifty horsepower when fully engaged.

SUMMARY OF THE INVENTION

A method of controlling brake power for a vehicle with an electrically variable transmission includes first determining if the available brake power is less than a power absorption capability of an energy storage system for the vehicle. When the power absorption capability of the energy storage system exceeds the vehicle brake power, the vehicle brake power is absorbed by the energy storage system. When the vehicle brake power exceeds the power absorption capability of the energy storage system, then vehicle conditions are evaluated to determine if control of an engine fan is allowable. When conditions allow for fan control then a request is sent for operation of the engine fan. The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
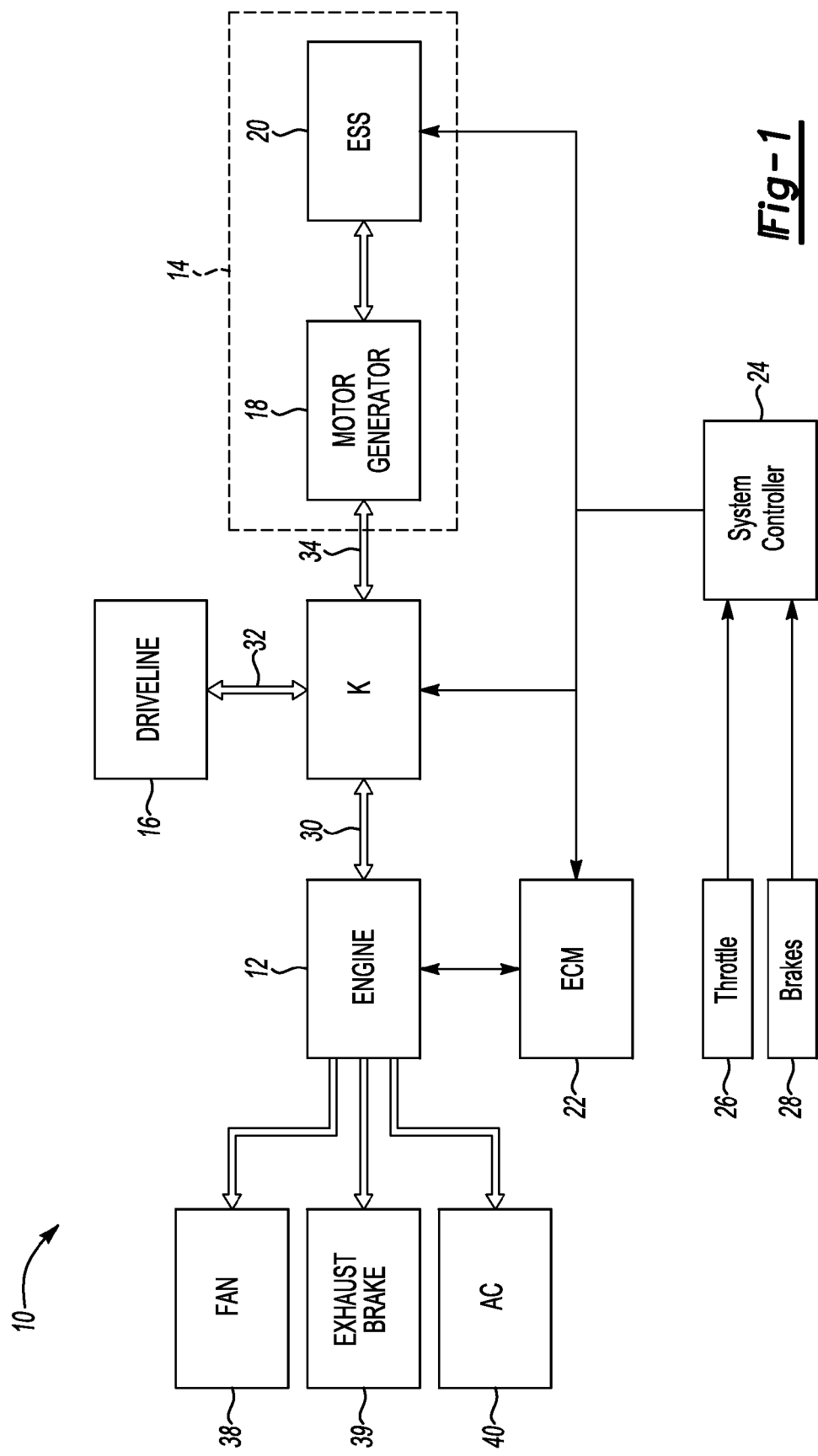
FIG. 1 is a schematic illustration of a heavy duty vehicle having an electrically variable transmission.

Referring to the Figures, wherein like reference numbers refer to the same or similar components throughout the several views, FIG. 1 schematically illustrates a heavy duty hybrid vehicle 10 including an engine 12, an electrically variable transmission 14, and a vehicle driveline 16. The transmission 14 includes at least one motor/generator 18 and an energy storage system (ESS) 20. The at least one motor/generator 18 may be two motor/generators 18 often referred to as motors A and B. Typically, the ESS 20 is one or more batteries in a battery pack module. Any appropriate energy storage means capable of bidirectional electrical energy flow may be used. The ESS 20 also includes various controllers, sensors, and a microprocessor for diagnosis and control of the battery pack.

An engine control module (ECM) 22 is connected to the engine 12 and includes a microprocessor (not shown) for controlling the engine 12. The ECM 22 communicates with a system controller 24. The system controller 24 also includes a microprocessor (not shown) and coordinates hybrid vehicle 10 operations. The system controller 24 is connected to various vehicle 10 components including the transmission 14, a vehicle throttle 26, and vehicle brakes 28 and various vehicle actuators and sensors (not shown) used for controlling vehicle 10 operations. The system controller 24 uses a standard communication network. For example, protocol standard J1939 from the Society of Automotive Engineers. The system controller 24 is also connected with the ESS 20

A coupling means (K) couples the various hybrid vehicle 10 components together and allows from bidirectional power flow between the components. The engine 12 is connected to the coupling means (K) through a mechanical connector 30. The driveline 16 is connected to the coupling means (K) with a mechanical connector 32. The at least one motor/generator 18 is connected to the coupling means (K) with a connector 34.

The system controller 24 receives various information, including a state of charge (SOC) of the ESS 20. The state of charge (SOC) is a percentage of the actual ESS 20 charge compared with the total ESS 20 charge capacity. The state of charge (SOC) of the ESS 20 has an ideal operating range which minimally provides sufficient charge for the various demands on the ESS 20 by the vehicle 10, while protecting the ESS 20 from overcharging. Accordingly, as used herein, the ESS 20 "power requirement" is charging power request amount sent to the system controller 24 by the ESS 20 to bring the ESS 20 to the optimal state of charge (SOC). During vehicle 10 braking, the system controller 24 coordinates braking control 36. Braking control 36 includes determining how and where to distribute the kinetic energy from the brakes 28. When the system controller 24 determines there is excess energy from the brakes 28 not required by the ESS 20, the system controller 24 will then determine if other vehicle 10 components may require the power. For example, the system controller 24 will next determine if an engine fan 38 needs to be powered and, if so, direct a portion of the excess power to the engine fan 38 by motoring the engine and requesting the fan engage. If the engine fan 38 does not use all the power, or if the engine fan 38 does not need the power, the system controller 24 may also look to other vehicle 10 components to determine if they need power. For example, the controller 24 may determined if the air conditioning system 40 needs power.

Figure 2:
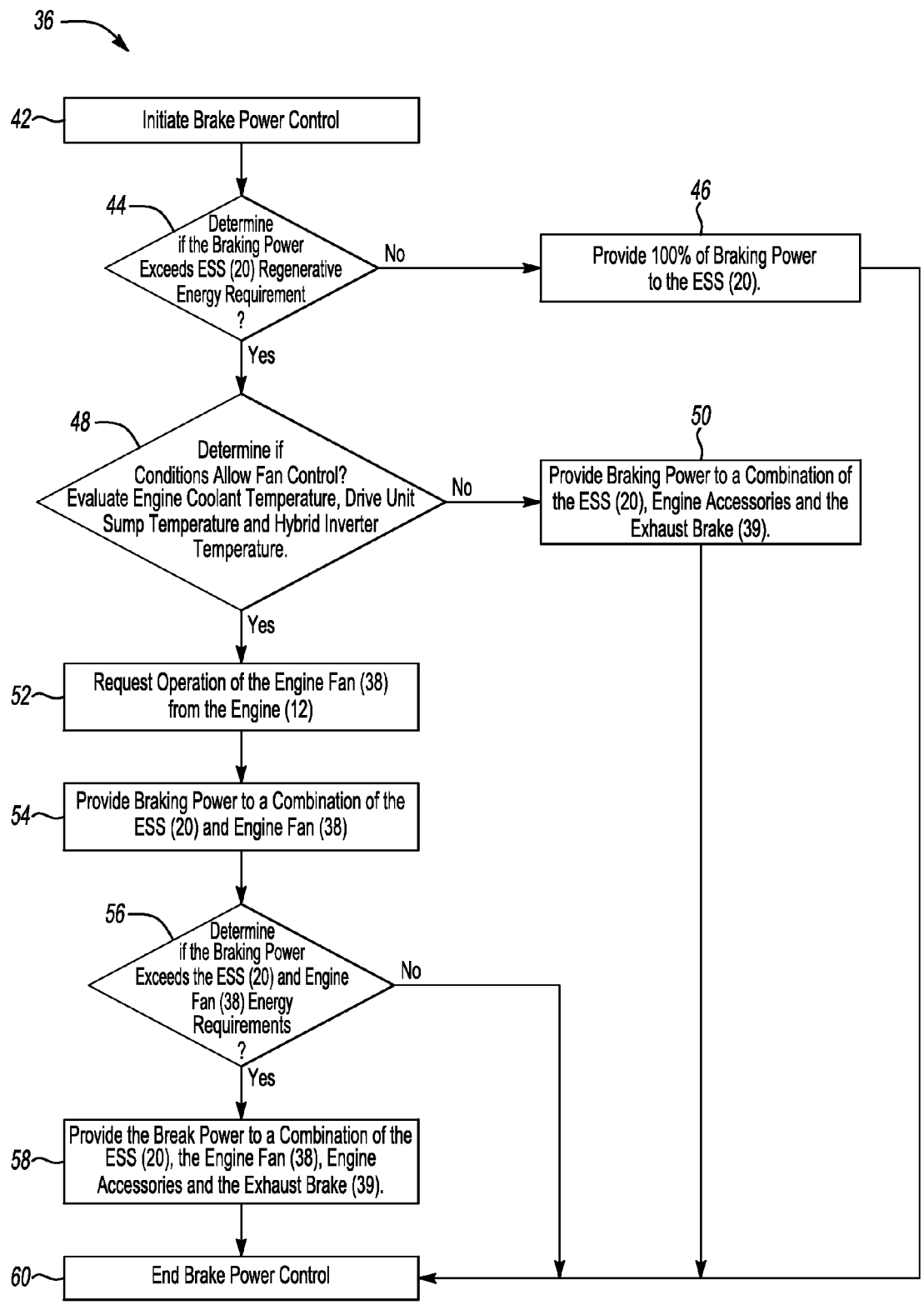
FIG. 2 is a schematic illustration of the method for coordinated braking and fan control of the vehicle of FIG. 1.

Referring to FIGS. 1 and 2, one embodiment of a method for braking control 36 is described. When a vehicle operator applies the brakes 26, the system controller 24 initiates braking control 36, step 42. The vehicle service brakes are also actuated at this time and the power required for their operation is designated separately from the braking control 36 described herein. One skilled in the art would know how to incorporate actuation of the service brakes with the method of braking control 36 described herein. The system controller 24 determines if the braking power available exceeds the ESS 20 power absorption capability, step 44. If the system controller 24 determines the breaking power available is not in excess of what the ESS 20 can absorb, then all of the braking power available is provided to the ESS 20, step 46.

If the system controller 24 determines excess braking power is available then the system controller 24 determines if conditions allow for engine fan 38 control, step 48. Allowing fan control means evaluating when conditions of the vehicle 10 are favorable for operation of the engine fan 38. Determining if the conditions allow for control of the engine fan 38 includes evaluating vehicle 10 conditions that are associated with the engine fan 38. For example, this may include evaluating an engine coolant temperature, a drive unit sump temperature, and a hybrid inverter temperature.

If conditions of the vehicle 10 do not allow for control of the engine fan 38 then the system controller 24 provides the braking power to the ESS 20 as required. The excess brake power is dissipated by an engine exhaust brake 39, step 50. Alternately, the excess power can be dissipated through the vehicle service brakes. The system controller 24 may also determine if other vehicle 10 accessories, such as the air conditioning (AC) 40, may utilize some of the brake power. If other engine accessories may utilize brake power the system controller 24 directs the requested brake power to that accessory prior to dissipating the remaining brake power with the exhaust brake 39 or the service brakes. The system controller 24 determines if the other engine accessories in the vehicle 10 may utilize brake power in the same manner as for the engine fan 38. That is, the system controller 24 evaluates associated conditions for the accessory. For example, for the AC 40, the system controller 24 may evaluate, among other things, an interior temperature of the vehicle 10.

If conditions of the vehicle 10 allow for control of the engine fan 38 the system controller 24 requests engine fan (38) operation from the engine 12, step 52. The system controller 24 may direct the engine 10 to operate the engine fan 38 at the maximum level in order to utilize as much of the available brake power as possible, step 54. Again the available brake power is that in excess of what is can be absorbed by the ESS 20. Operating the engine fan 38 at maximum with the available brake power will reduce the need to power the engine fan 38 at a future time, when the power must be provided from the engine 10 by increasing the fuel flow to mean the engine fan 38 and the vehicle 10 demands. Operating the engine fan 38 in this manner offsets the fuel which used to perform the same task, which increases the fuel economy of the vehicle 10.

After the available brake power is directed to power the ESS 20 and to the operation of the engine fan 38, the system controller 24 determines if there is any brake power still available, step 56. If there is still brake power available the system controller 24 determines if other vehicle 10 accessories, such as the AC 40, may utilize some of the brake power. If other vehicle 10 accessories may utilize brake power, the system controller 24 directs the requested brake power to that accessory. Any remaining brake power is then dissipated with the exhaust brake 39, step 58.

Once the system controller 24 has directed all of the available brake power, as described above, the braking control loop 36 is ended, step 60 and re-evaluated during the next control loop. As shown in FIG. 2, when the power absorption capability of the ESS 20 is sufficient to absorb all of the available brake power, step 46, the brake control loop 36 is ended step, 60 and looped back to the start. The brake control loop 36 intreates during each control loop while the driver is commanding the brakes and re-evaluates the input to determine if at any time conditions are appropriate to engage the engine fan 38 or other accessories. Once the vehicle 10 is stopped or the system no longer command the brakes there is no need for braking control 36 until the next time the operator brakes. Additionally, when fan operation is not required, the system controller 24 directs the brake power flow to the ESS 20, the engine accessories and the exhaust brake 39 until the vehicle is stopped or the system no longer commands braking, step 50. The braking control 36 is then ended, step 60, and the need for braking control 36 is not required until the next time the operator applies the brakes 28. Finally, the system controller 24 directs the brake power to the ESS 20, the engine fan 38, the engine accessories and the exhaust brake 39 until no brake power remains, step 58. The braking control 36 is then ended, step 60, and the need for braking control 36 is not required until the next time the operator applies the brakes 28.

In this manner, the power generated by braking may be utilized to operate the engine fan 38 and other vehicle accessories rather than dissipated by the exhaust brake 39 or the service brakes. Operating the fan in this manner provides a source of accessory power derived from the vehicle kinetic energy that is normally provided by fuel. Operating the engine fan 38 and other vehicle accessories with the available brake power will reduce the need to power the engine fan 38 and the accessories at a future time with fuel burned in the engine 12. Reducing the fuel burned to provide power for the accessories increases the overall vehicle 10 fuel economy.

While the best modes for carrying out the invention have been described in detail, those familiar with the art to which this invention relates will recognize various alternative designs and embodiments for practicing the invention within the scope of the appended claims.

The invention claimed is:

1. A method of controlling brake power flow for a vehicle with an electrically variable transmission comprising:
   determining if brake power exceeds a power absorption capability of an energy storage system for the vehicle;
   determining if conditions allow for control of an engine fan; and
   requesting operation of the engine fan when the brake power exceeds the power absorption capability of the energy storage system and when conditions allow for fan control.

2. The method of claim 1, further comprising directing the brake power to the energy storage system when the power absorption capability for the energy storage system exceeds the brake power.

3. The method of claim 1, further comprising dissipating the remaining brake power with an exhaust brake for the engine when conditions do not allow for fan control.

4. The method of claim 1, further comprising:
   determining if the brake power exceeds the combined power absorption capability of the energy storage system and the engine fan;
   determining if an engine accessory has a power requirement;
   providing brake power to the engine accessory when the engine accessory has a power requirement and the brake power exceeds the combined power requirement of the energy storage system and the engine fan.

5. The method of claim 4, further comprising repeating the determining if the braking power exceeds the combined power absorption capability of the energy storage system and the engine fan, determining if the engine accessory has a power requirement and providing brake power to the engine accessory until one of there is no remaining brake power to provide and there is no engine accessory with a power requirement.

6. The method of claim 5, further comprising dissipating the remaining brake power with an exhaust brake for the engine when there is no engine accessory with a power requirement.

7. The method of claim 1, wherein determining if conditions allow for control of an engine fan further includes evaluating an engine coolant temperature, a drive unit sump temperature, and a hybrid inverter temperature.

8. The method of claim 1, wherein requesting operation of the engine fan further includes requesting operation of the fan at full power.

9. A method of controlling brake power flow for a heavy duty vehicle with an electrically variable transmission comprising:
   determining if the braking power exceeds a power absorption capability of an energy storage system for the vehicle;
   performing one of directing the braking power to the energy storage system when the power absorption capability for the energy storage system exceeds the braking power and determining if conditions allow for control of an engine fan when the braking power exceeds the power absorption capability for the energy storage system;
   requesting operation of the engine fan when the braking power exceeds the requirement of the energy storage system and when conditions allow for fan control; and
   dissipating the remaining braking power with an exhaust brake for the engine when conditions do not allow for fan control.

10. The method of claim 9, further comprising:
    determining if the braking power exceeds the combined absorption capability of the energy storage system and the power requirement of the engine fan;
    determining if an engine accessory has a power requirement; and
    providing braking power to the engine accessory when the engine accessory has a power requirement and the braking power exceeds the combines absorption capability of the energy storage system and the power requirement of the engine fan.

11. The method of claim 10, further comprising repeating the determining if the braking power exceeds the combined power absorption capability of the energy storage system and power requirement of the engine fan, determining if the engine accessory has a power requirement and providing braking power to the engine accessory until one of there is no remaining braking power to distribute and there is no engine accessory with a power requirement.

12. The method of claim 9, wherein determining if conditions allow for control of an engine fan further includes evaluating an engine coolant temperature, a drive unit sump temperature, and a hybrid inverter temperature.

13. The method of claim 9, wherein requesting operation of the engine fan further includes requesting operation of the fan at full power.

* * * * *